March 17, 1970 D. A. HAYNES 3,501,240
OPTICAL WHEEL ALIGNMENT APPARATUS
Filed Sept. 9, 1966 8 Sheets-Sheet 1
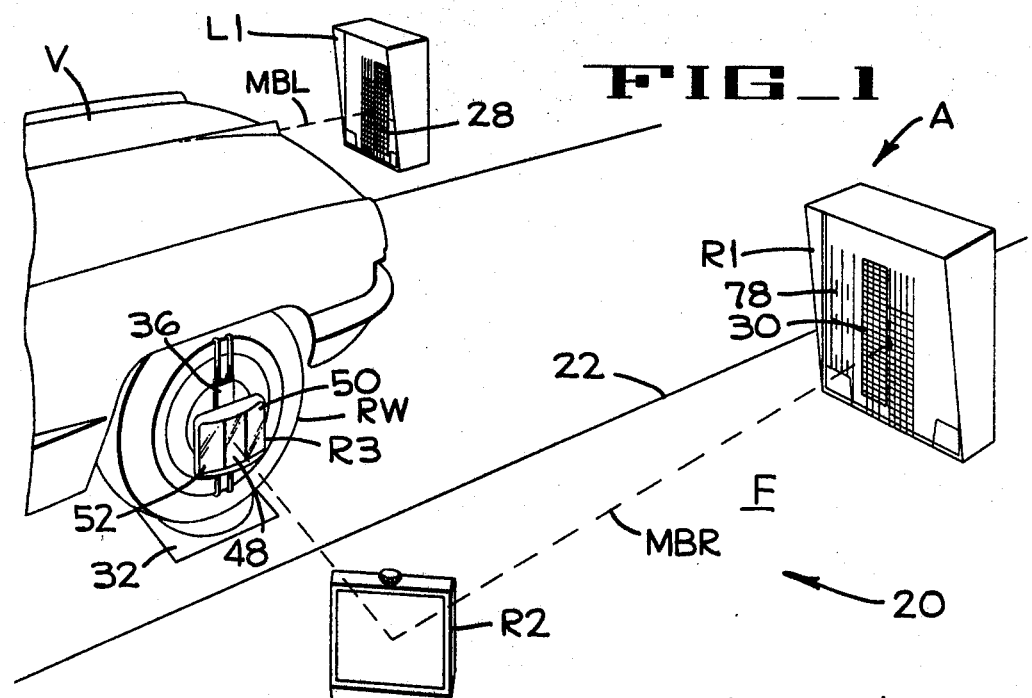
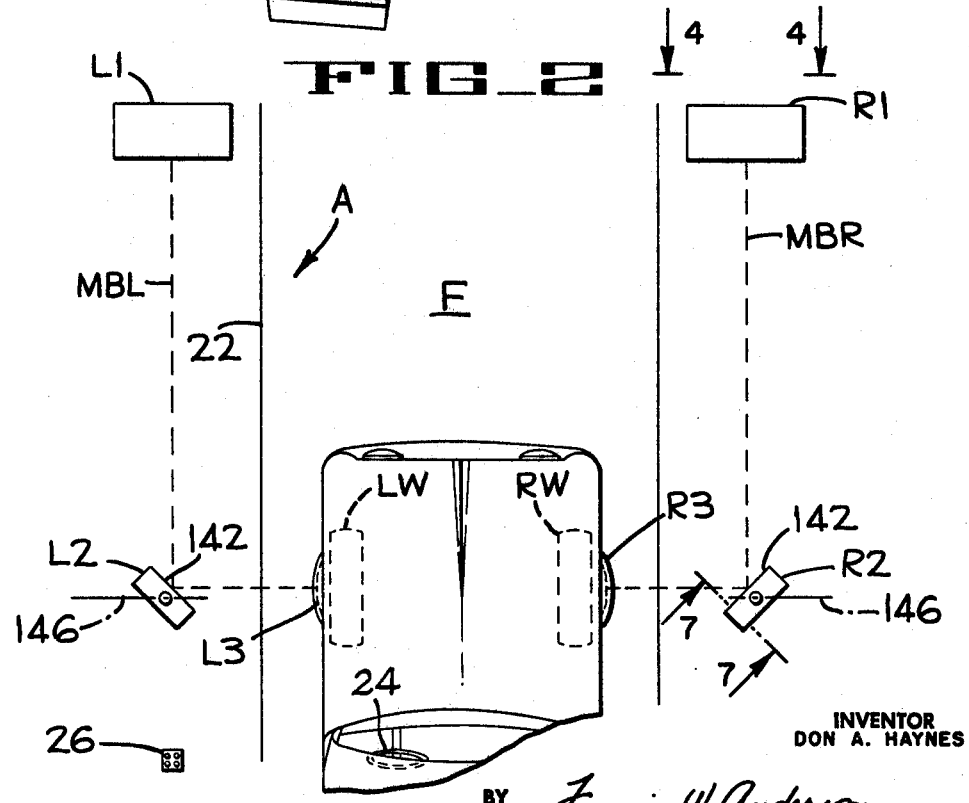
INVENTOR
DON A. HAYNES
BY Francis W. Anderson
ATTORNEY

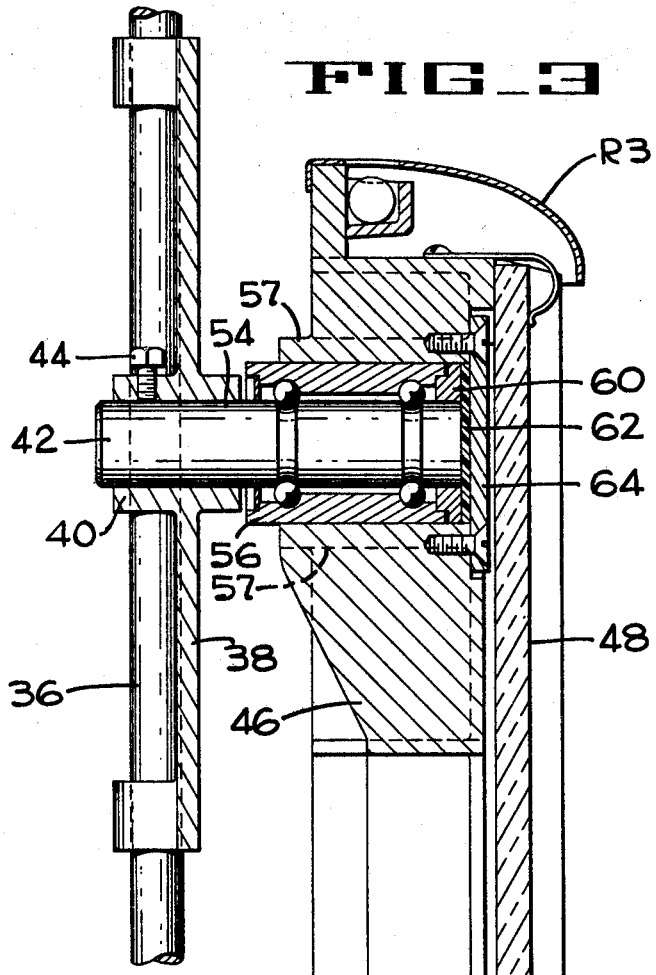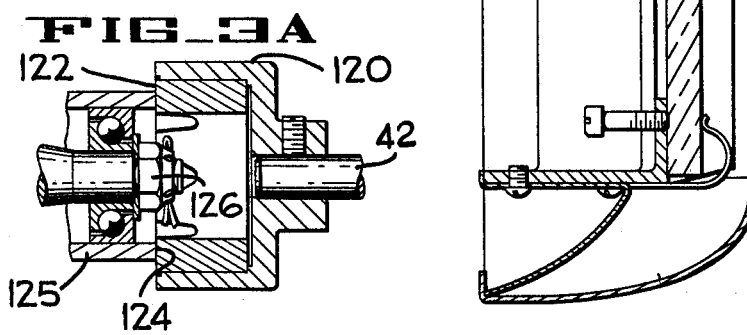

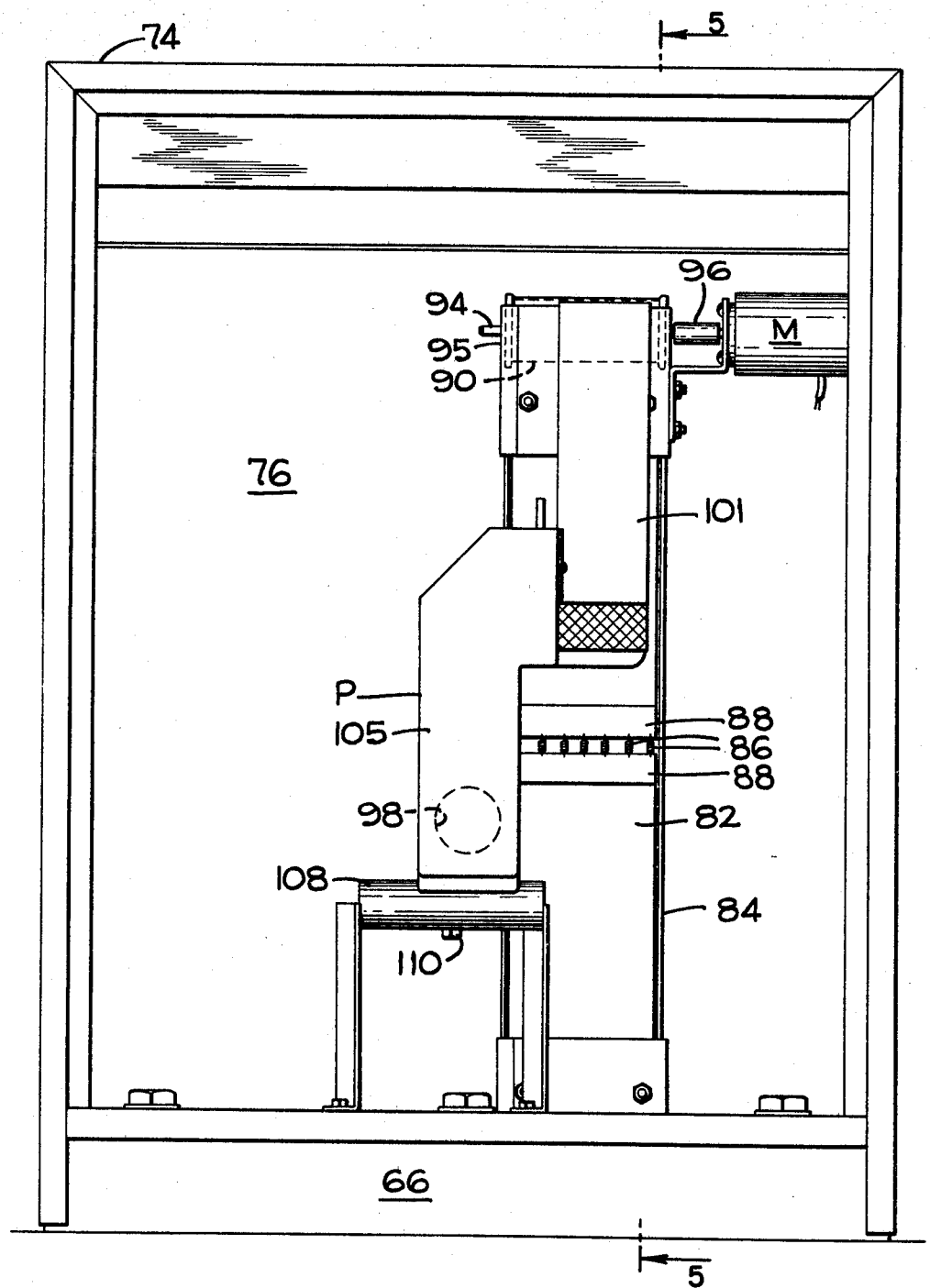
FIG_4

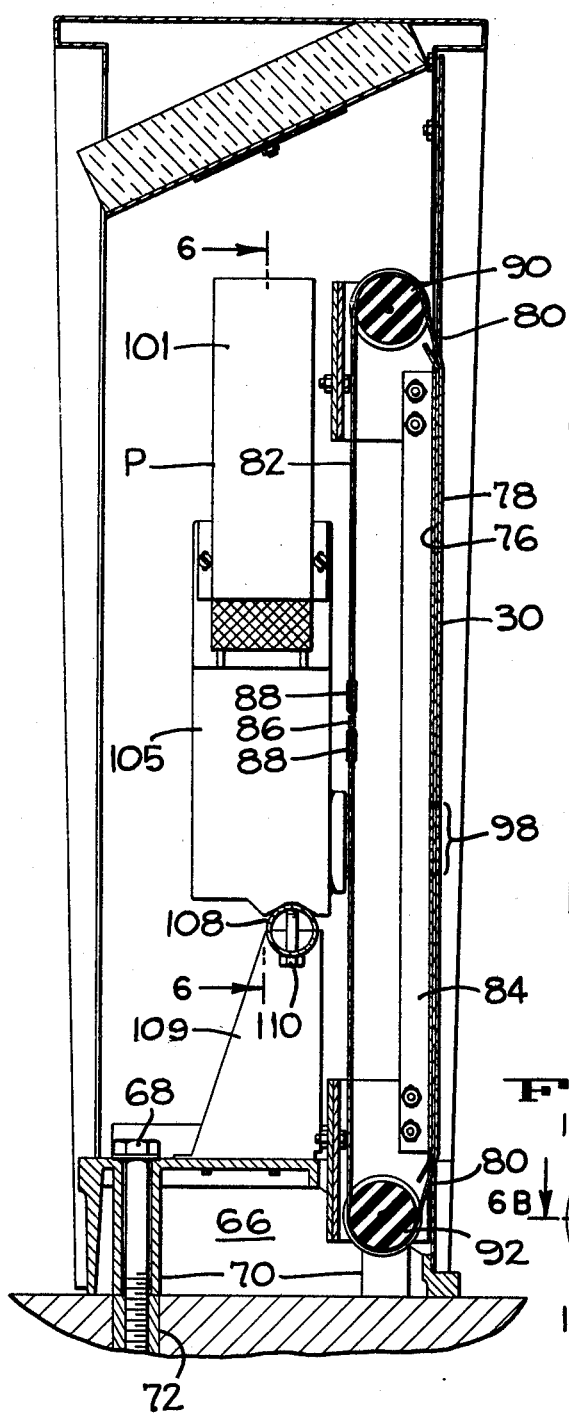
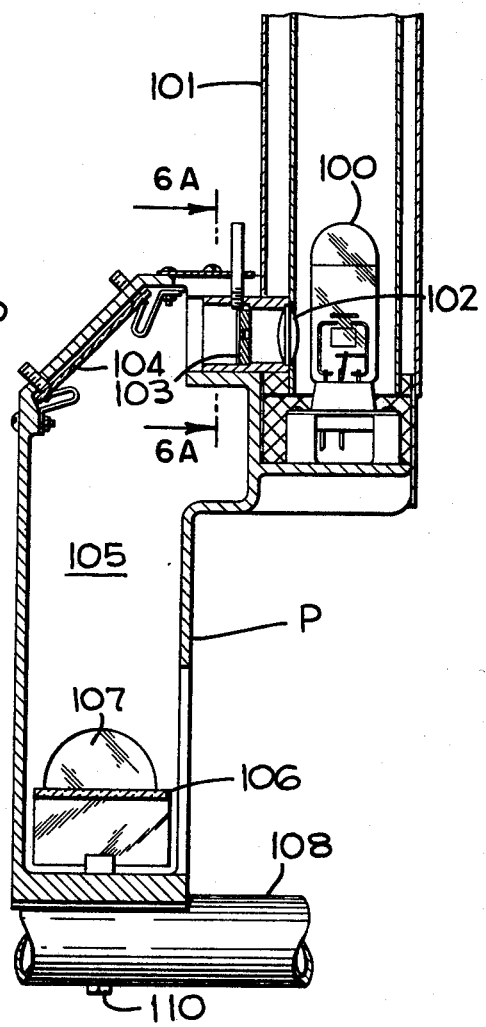
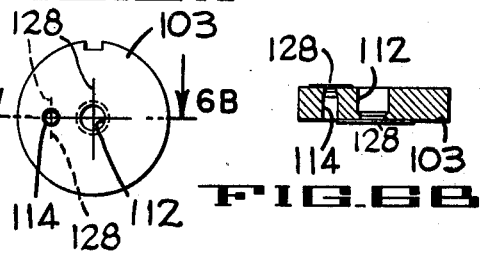

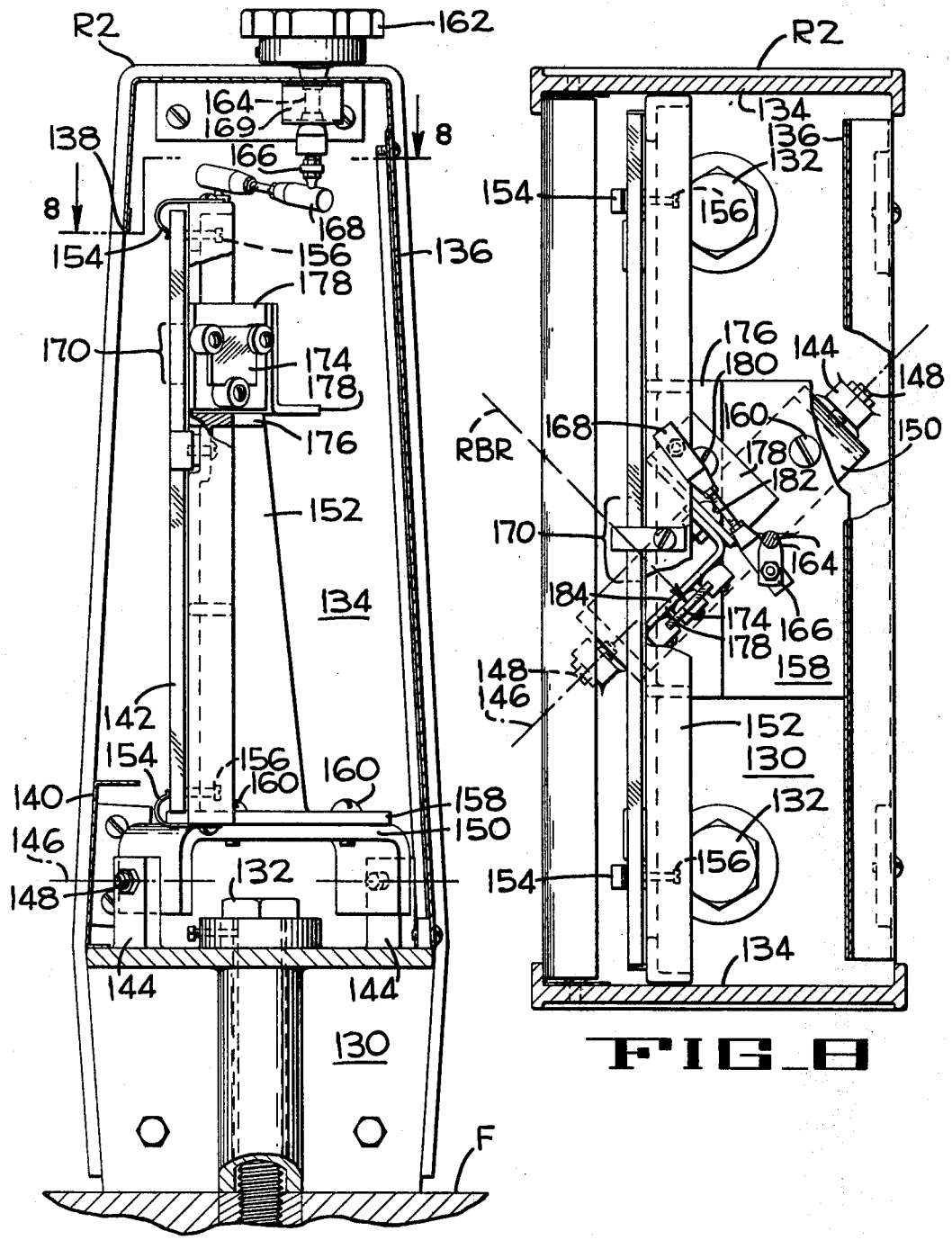

March 17, 1970  D. A. HAYNES  3,501,240
OPTICAL WHEEL ALIGNMENT APPARATUS
Filed Sept. 9, 1966  8 Sheets-Sheet 6
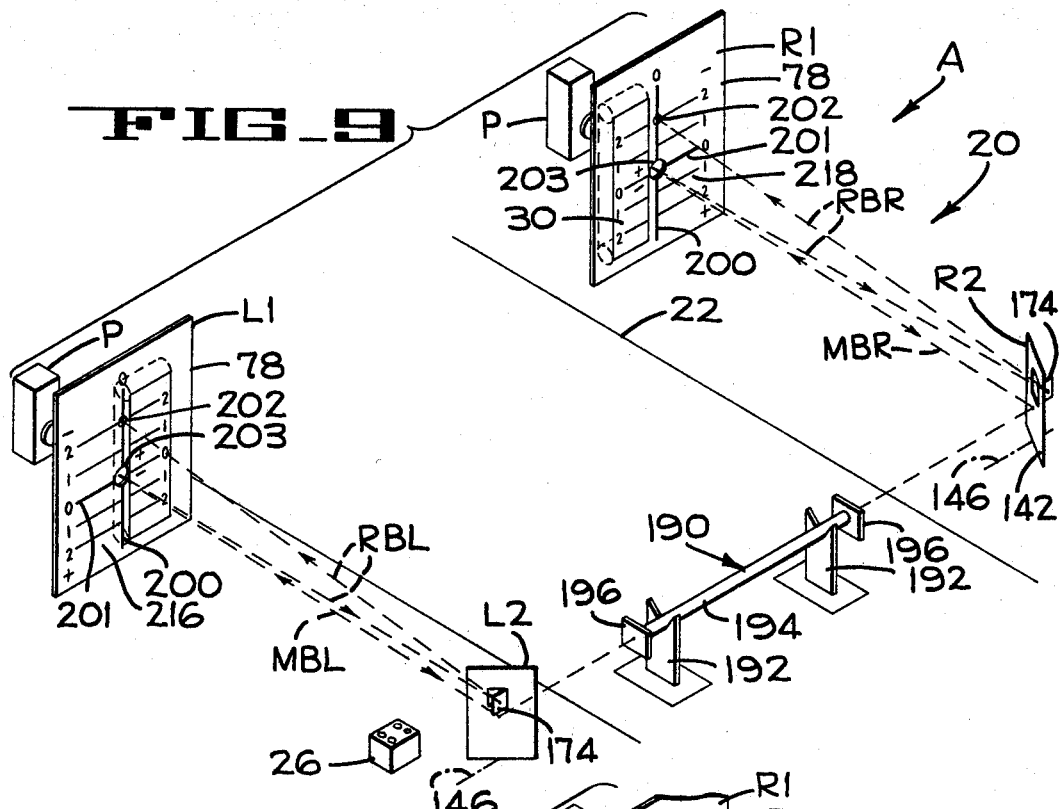
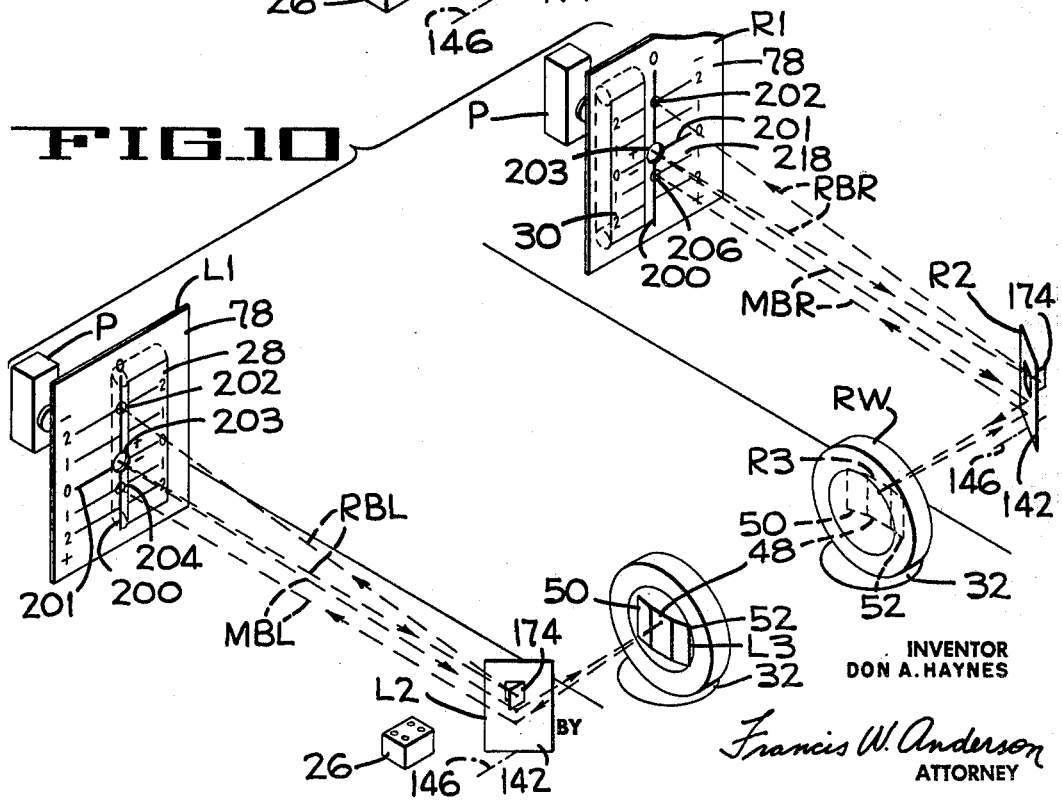
INVENTOR
DON A. HAYNES
BY Francis W. Anderson
ATTORNEY

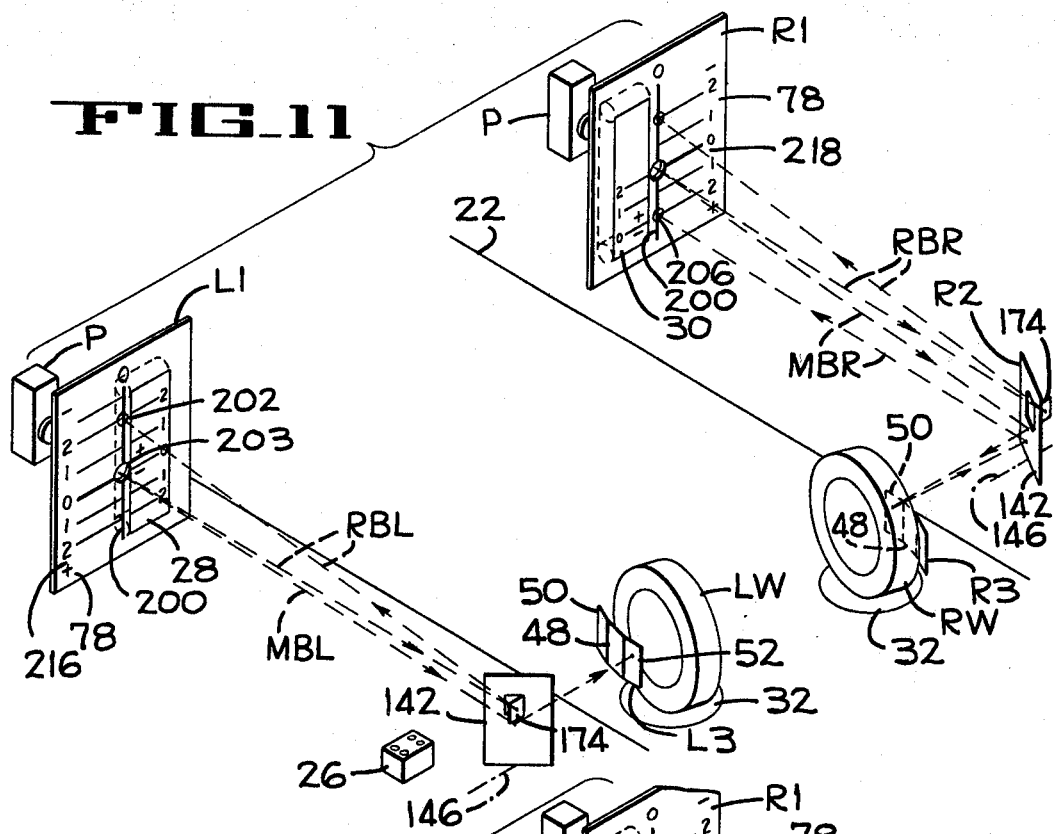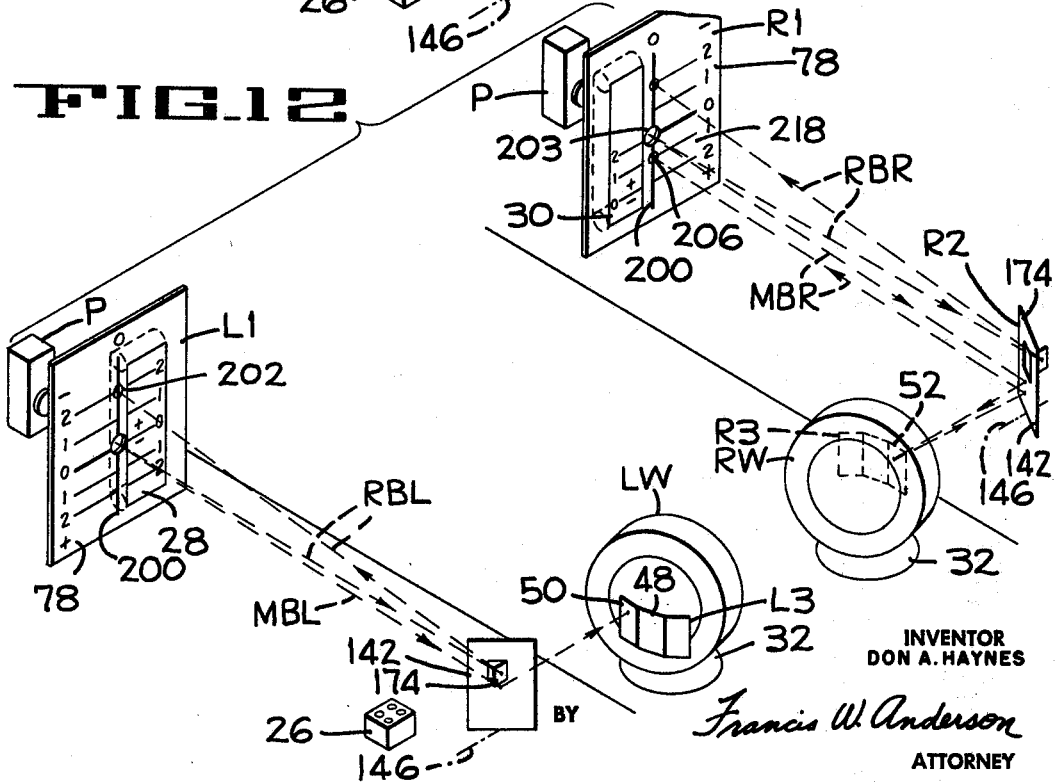

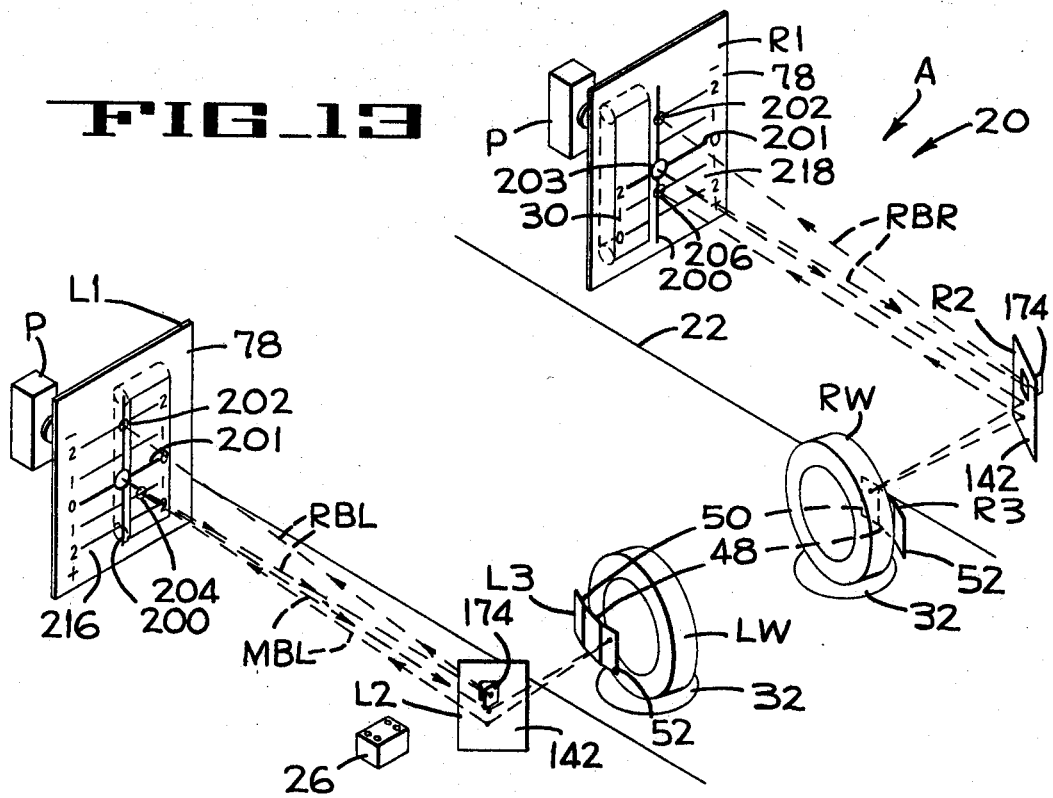
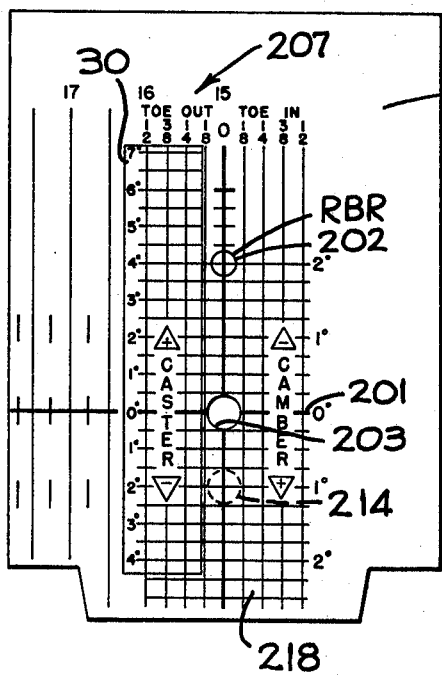

United States Patent Office 3,501,240
Patented Mar. 17, 1970

3,501,240
OPTICAL WHEEL ALIGNMENT APPARATUS
Don A. Haynes, Okemos, Mich., assignor to FMC Corporation, San Jose, Calif., a corporation of Delaware
Filed Sept. 9, 1966, Ser. No. 578,391
Int. Cl. G01b 11/26
U.S. Cl. 356—155                               13 Claims

ABSTRACT OF THE DISCLOSURE

There is disclosed, for each front wheel of a vehicle, optical wheel alignment apparatus which has a projector to project a beam to a relay mirror and from there to a pendulous three face mirror on the front wheel of the vehicle. The wheel mirror is damped by a silicone substance which quickly brings the mirror to rest. The relay mirror reflects a reference beam back to the projector and passes a measuring beam to the vehicle wheel. The apparatus includes a fixed chart and a movable chart at the projector, the latter controlled from a station adjacent the vehicle steering wheel. The projectors and charts for the two wheels are spaced apart to permit passage of a vehicle therebetween for diagnostic lane testing.

---

The present invention concerns apparatus for determining the wheel alignment characteristics of vehicle wheels by a mirror, light beam and measuring chart arrangement. More specifically, the invention provides wheel alignment apparatus which is especially useful in the relatively new diagnostic lane system where the vehicle is moved forward through plurality of checking stations, including a wheel alignment measuring station, at which the mechanical condition of the various components of the vehicle are determined and recorded, and following which the conditions requiring attention are corrected in a service bay.

In general terms, the present invention is an improvement over the optical wheel aligner disclosed in the patent to J. P. Carr No. 2,700,319, and further provides a system by means of which an operator stationed adjacent the steering wheel of the vehicle can determine all of the wheel alignment characteristics from that station.

An object of the present invention is to provide optical wheel alignment apparatus especially adapted for use in diagnostic lanes.

Another object of the invention is to provide apparatus according to the preceding object wherein an operator can determine the wheel alignment characteristics while stationed adjacent the steering wheel of the vehicle.

Another object is to provide a remotely displaceable measuring chart for each of the wheels to determine the wheel alignment measurements from a single operator's station.

Another object is to provide a self-damping wheel mirror assembly in an optical wheel alignment system so that the oscillations rapidly diminish in a previously mounted wheel mirror as the vehicle is brought into position for an alignment measurement.

Another object is to provide optical wheel alignment apparatus which is less complex, and hence less costly, than present apparatus of the same general type.

A further object is to provide optical wheel alignment apparatus wherein the measurements can be obtained for each wheel by a single beam of light.

Other objects and advantages of the present invention will become apparent from the following description and the accompanying drawings, in which:

FIGURE 1 is a diagrammatic perspective including two projection screen units behind which the measuring beams originate, and one of the relay mirror units which reflects the measuring beam to and from a wheel-mounted mirror.

FIGURE 2 is a diagrammatic plan of the apparatus shown in FIGURE 1.

FIGURE 3 is a substantially central vertical section through the wheel mirror assembly shown in FIG. 1.

FIGURE 3A is a section through a magnetic mirror mounting hub and part of the hub of a wheel.

FIGURE 4 is a rear elevation, indicated by the arrows 4—4 in FIGURE 2, of the right-hand projection screen unit.

FIGURE 5 is a vertical section taken along lines 5—5 in FIGURE 4.

FIGURE 6 is a section through the projector shown in FIGURES 4 and 5, and is taken along lines 6—6 in FIGURE 5.

FIGURE 6A is an elevation taken along lines 6A—6A in FIGURE 6.

FIGURE 6B is a section taken along lines 6B—6B in FIGURE 6A.

FIGURE 7 is a vertical section, indicated generally by the arrows 7—7 in FIGURE 2, of the right hand relay mirror unit.

FIGURE 8 is a horizontal section indicated by the lines 8—8 in FIGURE 7.

FIGURES 9–13 are diagrammatic operational perspectives illustrating various steps in obtaining the wheel alignment characteristics of the front wheel of an automobile.

FIGURE 14 is an elevation of the measuring chart associated with the right hand projection screen unit.

With general reference to FIGURES 1 and 2, the optical wheel alignment apparatus A of the present invention may be installed at an inspection station 20 in straddling relation to a diagnostic lane 22. At various locations along the lane 22, testing procedures for vehicles are carried out to determine mechanical conditions which may require correction, such as the wheel alignment characteristics with which the present invention is concerned. After determining and recording the various mechanical conditions, the vehicles are routed to service bays for the required adjustments or repair. The wheel alignment apparatus A includes features which assure rapid determination of the wheel alignment characteristics, and thus assist in maintaining a uniform flow of vehicles along the lane 22.

Certain of the alignment characteristics of the front wheel RW at the right side of a vehicle V are determined by a projection screen unit R1, a relay mirror unit R2, and a wheel mirror unit R3. Similarly, certain alignment characteristics of the left front wheel LW are checked by a projection screen unit L1, a relay mirror unit L2, and a wheel mirror unit L3. Other measurements of each wheel, as will be later described in conjunction with FIGURES 9–12, are indicated by the opposite screen unit R1 or L1. Both the screen units R1–L1, and the relay mirror units R2–L2 may be prealigned and secured to the floor F to preserve such alignment. Only one operator, stationed adjacent the steering wheel 24, can obtain and record all of the wheel alignment characteristics by means including an electrical switch unit 26 which individually remotely controls vertically movable caster measuring charts 28 and 30 of the screen units L1 and R1, respectively.

In general terms, the wheel alignment measurements are obtained by affixing the wheel mirror units L3 and R3 to the wheels LW and RW (at some upstream location, if possible, where a different part of the vehicle is checked) and moving the vehicle to the inspection station 20 to position the wheels on individual turntable 32. The projection screen units L1 and R1 contain projectors which respectively emanate measuring beams MBL and MBR. Each projector also projects a reference beam RBL or RBR which is associated with the measuring beam but is not essential to the alignment determination. The reference beams are useful in aligning the relay mirror units L2 and R2, and in checking wheel runout or lateral wobble. Measuring beam MBR impinges the relay mirror unit R2, is reflected onto the wheel mirror unit R3, and returns to the face of the screen unit R1 via the relay mirror unit, at which it lies upon indicia indicating a wheel alignment characteristic which is visible to the operator adjacent the steering wheel of the vehicle. The corresponding parts at the other side of the vehicle operate in similar manner, and both the left and right measurements are effected in a manner generally known in the prior art except for the Caster measurement and the means for obtaining this measurement by the operator from his one vantage point.

With more detailed reference to the structural components, the wheel mirror unit R3 (FIG. 3) is constructed along the general lines of the mirror unit disclosed in the Carrigan Patent No. 2,765,701, but has special provisions which rapidly damp its oscillations as the vehicle wheels are driven onto the turntables 32, or after the mirror unit is affixed to the wheel when the vehicle has been positioned on the turntables. Prior wheel mirror units of this type swing back and forth and must be stopped by hand because it requires a relatively long period of time for the swinging to cease, and the mirror unit must gravitate to its rest position before the alignment measurements can be made.

The conventional components of the wheel mirror unit R3 (FIG. 1) include a wheel mirror mount 36, of the type disclosed in the Holmes Patent No. 2,475,502, which grips the rim portion of the wheel of the vehicle. The mirror mount 36 (FIG. 3) has a vertically slidable bracket 38 with a hub 40 that is arranged to receive a pivot shaft 42 of the wheel mirror unit R3. The pivot shaft is supported in a position normal to the general plane of the wheel RW, and a bolt 44 locks the pivot shaft in the hub 40. The wheel mirror unit R3 is provided with a body casting 46 which carries three mirrors, a central mirror 48 (FIG. 1) which is adjustably mounted and fixed in a position normal to the axis of the pivot shaft 42, and hence parallel to the general plane of the wheel RW, a forward mirror 50, and a rear mirror 52. The mirrors 50 and 52 each have reflecting surfaces offset 15 degrees from the reflecting surface of the central mirror 48.

The pivot shaft 42 is part of a purchased, ball bearing cartridge unit 54 including an outer shell or bearing race 56 which is locked into a cylindrical hub portion 57 of the body casting 46. This provides a pivotal connection between the body casting 46 and the pivot shaft 42, and since the major portion of the wheel mirror unit R3 lies below the pivot shaft, it tends to oscillate back and forth for a relatively long time before it comes to rest. To damp these oscillations a particularly effective solution has been discovered in a commercially available silicon product, and in a structural addition to the bearing unit 54.

To attain the noted damping action a ring 60 is pressed onto the outer end portion of the pivot shaft 42. The ring 60 has a flat outer surface which is both flush with the end of the pivot shaft, and perpendicular to the axis of the pivot shaft, and defines the inner limit of a shear chamber 62. A clear plastic cover plate 64 is bolted to the outer face of the hub 57 and has an inner surface which is parrallel to the confronting surface of the ring 60 to define the outer limit of the shear chamber 62. The axial extent of the chamber 62, exaggerated in the drawing for clarity, is only about .030 of an inch, and the chamber is filled with a silicone compound such as that identified as 210 Fluid Silicone manufactured by the Dow Corning Corporation. The clear plastic cover plate 64 provides a convenient way to check the amount of compound in the chamber; with the chamber upright, as shown in FIGURE 3, only a very small air bubble should be visible after the compound has settled. This silicone compound is characterized by a very high kinematic viscosity, in the order of 2,500,000 centistokes, which is substantially unchanged at any degree of normal temperature. Accordingly, any relative motion occurring between the cover plate 64, and the ring 60 and end surface of the pivot shaft 42 at the other side of the shear chamber, causes a shear force in the body of the silicone compound, which shear force rapidly diminishes due to the high kinematic viscosity of the compound. The oscillations are thereby rapidly damped to immobilize the mirror unit R3 in its alignment measuring position.

The projection screen units L1 and R1 are of similar construction whereby a description of the screen unit R1 (FIGS. 4 and 5) will make obvious a certain reversal of parts in the screen unit L1.

A base casting 66 is secured to the floor F, for instance by lag screws 68 which extend through bosses 70 and into expansion plugs 72 set in the floor. An inverted U-shaped sheet metal housing 74 is bolted to the base casting 66 and has a front panel 76 secured thereto. The front panel 76 is normal to the centerline of the lane 2 (FIGS. 1 and 2), and is therefore substantially normal to the longitudinal centerline of the vehicle V. A fixed measuring chart 78 (FIG. 1) is secured to the front face of the panel 76 and has a cut out portion to accommodate the movable measuring chart 30. Panel 76 is provided with two vertically spaced horizontal slots 80 (FIG. 5) through which one flight of the movable caster measuring chart extends in the form of an endless band 82.

Secured to the inside of the front panel 76 is a channel bar 84 which stiffens the panel and provides a track for the inner flight of the endless band 82. Tension is maintained in the band by a plurality of springs 86 that interconnect metal clips 88 on the confronting ends of the bands 82; this keeps the band taut about a motor-driven rubber roller 90, and a rubber idler roller 92. The driven roller 90 has a shaft 94 which is journalled in a bracket 95 and is secured by a coupling 96 to the power output shaft of an electric chart motor M which can drive the roller 90 in either direction. Selective directional control of the chart motor M is remotely governed by the electrical switch unit 26 (FIG. 1), adjacent the steering wheel of the vehicle, independently of another motor, not shown, which is associated with the movable chart 28 of the screen unit L1 and is similarly controlled by the same switch unit. The chart motors have built in brakes and gear reducers which facilitate precise positioning of the movable caster charts 28 and 30 as required.

Apertures 98 (FIG. 5) in the front panel 76 and the fixed measuring chart 78 are provided for the projection of the measuring beam MBR and the reference beam RBR, which beams originate within the screen unit R1 from a projector P. The projector is constructed in accord with the disclosure in the copending Lill patent application Ser. No. 250,116 that is assigned to the same assignee as the assignee of the present invention. As shown in FIGURE 6, the light beam from a projection lamp 100 in a lamp housing 101 passes through a condensing lens 102, through apertures in a reticle disc 103, and impinges a mirror 104 which is adjustably mounted in a cast housing 105. The reticle disc 103 is later described, and its apertuers form the measuring beam MBR and the reference beam RBR.

The mirror 104 is positioned 45 degrees to the optical axis of the condensing lens 102 and reflects the beam downward onto a second mirror 106. Mirror 106 is a 45 degrees to the axis of the beam and reflects the beam through a projection lens 107, that is aligned with the apertures 98, whereby the beams MBR and RBR are projected toward the relay mirror unit R2. The base of the housing 105 of the projector P (FIGS. 5 and 6) is recessed to rest upon a fixed horizontal tube 108 which has a vertical aperture, not shown. The tube is supported by brackets 109 atop the base casting 66, and the aperture permits adjustable rocking movement of a mounting bolt 110, which is threaded into the housing 105, in directions elevating or lowering the light beams MBR and RBR so that they can be elevationally positioned to strike the relay mirror unit R2 (FIG. 1). The reticle disc 103 (FIGS. 6A and 6B) has a central aperture 112 which forms the measuring beam MBR and a smaller aperture 114 which forms reference beam RBR. While the beams RBR and MBR diverge slightly, it will be apparent that they are always in predetermined alignment relative to each other.

Referring now briefly to FIGURE 3A, a conventional magnetic hub mount 120 can be used in lieu of the mirror mount 36 to support the mirror unit R3, if runout or lateral wobble of the rim of the wheel is not checked. In such instances, the reference beam RBR is not essential to the alignment measuring operation for reasons which will appear later. The details of the magnetic hub mount 120 are not important to the present invention, but in general include an annular magnetic end face 122 which is magnetically coupled to the machined outer end face 124 of the wheel hub 125 of the vehicle. The spindle nut 126 lies within the hollow body of the hub mount 120 adjacent the pivot shaft 42 of the wheel mirror unit R3. Thus mounted, the wheel mirror unit is parallel to the general plane of the vehicle wheel RW.

Returning to FIGURES 6, 6A and 6B, it will be noted that the reticle disc aperture 114 is horizontally aligned with the aperture 112. This alignment causes the two beams MBR and RBR, exteriorly of the projection lens 107, to lie in vertical alignment. The reason for such alignment is that the spots at which the beams strike the mirror 104 are in horizontal alignment, whereby they impinge the mirror 106 in vertical alignment coincident with the optical axis of the projection lens. The lens inverts the projected beams, so that the reference beam RBR lies vertically above the measuring beam MBR. Each aperture 112 and 114 is provided with cross hairs 128. Since the reference and measuring beams travel different distances before returning to the chart 78, the cross hairs are mounted on opposite sides of the reticle disc to obtain a sharp focus of their images on the chart 78.

The relay mirror unit R2 (FIGS. 7 and 8) includes a base casting 130 which may be secured to the floor F by lag screws 132, or the like, to preserve a predetermined alignment of the mirror unit relative to the beams RBR and MBR. An upright wall 134 is bolted to each end of the base 130, and a sheet metal shroud 136 is connected to the walls and base to enclose the rear and most of the upper portion of the mirror unit. Thus, the shroud 136 has a front wall terminating at 138, which, in conjunction with a lower shroud 140 and the walls 134 forms a window opening to expose a mirror 142. The above mentioned alignment of the mirror unit R2 is that in which the mirror 142 lies precisely at 45 degrees, measured in a horizontal plane, to the measuring beam MBR.

The base 130 is provided with a pair of spaced, upstanding lugs 144 which have threaded apertures on a common horizontal axis 146 that, as best shown in FIG. 2, lies 45 degrees from the mirror 142 and perpendicular to the longitudinal centerline of the lane 22. As indicated by the same reference numerals for the relay mirror unit L2, its mirror 142 and axis 146 have a similar orientation relative to the lane 22. A cone point pivot screw 148 extends along the axis 146 through each lug 144 in bearing relation to a U-shaped support 150, which indirectly supports the mirror 142 so that the mirror is mounted for pivotal movement about said axis.

The mirror 142 is mounted to a mirror bracket 152 by spring steel clips 154, and screws 156 which are threaded through the bracket and bear against the rear face of the mirror provide for adjusting the mirror relative to the bracket. A base flange 158 of the bracket 152 is secured to the U-shaped support 150 by screws 160. Tilting movement of the bracket 152 and the mirror 142 about the axis 146 is controlled by an exterior knob 162 mounted on a rotatable shaft 164. A lever 166 on the lower end of the shaft is connected by a ball coupling link 168 to the bracket 152 so that rotation of the knob 162 will effect the above mentioned tilting of the mirror. A spring clip 169 bears against the shaft 164 so that the shaft will maintain any rotative position.

Near its upper edge a small area of the mirror 142, is unsilvered to provide a clear window portion in the area enclosed by the bracket 170. The window at 170 is provided to allow the projected reference beam RBR to pass beyond the mirror 142 and impinge a small reference beam mirror 174. The mirror 174 is adjustably mounted on a flange 176 of the bracket 152 by two angle clips 178, one of which is held by a bolt 180 to the flange 176, and the other of which is secured to the first clip by a bolt 182 and has an aperture at 184 to clear the reference beam RBR. By appropriate adjustment of the angle clips, the reference beam mirror is positioned to be vertical when the mirror 142 is vertical, and to be at 45 degrees from the mirror 142 as an horizontal plane. The reference beam mirror in the installed alignment apparatus shown in FIGURE 2 thus lies normal to the reference beam RBR and consequently directs the beam back toward the screen unit R1.

OPERATION

With reference to FIGURES 1 and 9–12, the wheel alignment apparatus A is installed for operation by the use of a checking fixture 190 which includes a pair of pedestals 192, and a tube 194 supported by the pedestals and having end mirrors 196 which are perpendicular to the tube and parallel to each other. With the checking fixture 190 occupying the checking position for the wheels LW and RW, the operator actuates switches in the switch unit 26 to turn on the projectors P in the screen units L1 and R1.

When the relay mirror units L2 and R2 have been properly located and adjusted, by means of the various provisions already described, and with the checking fixture 190 in place, the reflected images of the reference beams RBR and RBL are returned by their respective mirrors 174 onto vertical zero lines 200, on the fixed measuring charts 78, and onto a fixed target point 202 which is also shown in FIGURE 14 for the right hand chart 78. Thus positioned, the measuring beam images MBR and MBL return to their source at 203 after being relayed to the checking fixture mirrors 196 by the relay mirror units L2 and R2, and returned to the charts by the same means, whereby they lie at the intersection of vertical zero line 200 with a horizontal zero line 201. The alignment apparatus A is then ready for an indefinite number of wheel alignment measuring operations determining the wheel camber, toe, caster and toe on turns, unless the prealignment of the various components is accidentally disturbed. In actual practice, the prealignment may be check daily by use of the checking fixture 190.

After removing the checking fixture, the vehicle is moved into place along the lane 22 (FIG. 10) to position the wheels LW and RW on the turntables 32. The wheel mirror units L3 and R3 can be placed on the wheels at this time, but as previously mentioned, the wheel mirror units may be installed at a vehicle checking station upstream from the station 20. In either case, the unique damping arrangements for the wheel mirrors, as described in conjunction with FIGURE 3, facilitates the gravitational positioning of the mirrors to their rest positions necessary for an alignment measurement operation.

The technician who determines and records the alignment measurements stands beside the steering wheel of the vehicle. To determine camber and toe, the technician turns the steering wheel to swing the wheel mirror units L3 and R3 until one or the other of the measuring beam images lies on the vertical zero line 200.

It will be assumed that the camber and toe of the right wheel RW will be checked. For this purpose, the measuring beam image associated with the left hand relay mirror unit L2 (FIG. 10) and the wheel mirror unit L3 may be centered on the vertical zero line 200 of the chart 78 in screen unit L1; this image is shown at 204. The image of the measuring beam MBR is relayed back to its chart by the relay mirror unit R2 and the wheel mirror unit R3; this image is shown at 206. Because the amount of lateral tilt of the central mirrors 48 in the wheel mirror units L3 and R3 is the same as the camber or lateral tilt of the corresponding wheel LW or RW, respectively, the measuring beam images 204 and 206 are vertically displaced from their initial positions according to the degree of camber in the wheels. If the camber is negative due to the top portion of the wheel being tilted inward relative to its lower portion, the measuring beam image 204 or 206 will lie above the horizontal zero line 201, and if positive camber is present the image will lie below the zero line 201. Thus, the measuring beam image 204 in FIGURE 10 indicates, on a camber scale 216, a positive chamber or 1 degree for the wheel LW. The measuring beam image 206 for the wheel RW lies on the 1 degree positive camber marking of its camber scale 218. These measurements are readily visible to the technician adjacent the steering wheel of the vehicle, and are recorded by him for future correction.

If the vehicle wheels LW and RW have not toe in or toe out, the measuring beam images 204 and 206 will obviously lie as illustrated on the vertical zero lines 200 of the charts 78, just as occurred when the apparatus was set up with the checking fixture 190. If the measuring beam image 204 is centered on the vertical zero line 200 and toe-in is present, the image 206 will be displaced to the right of the vertical zero line 200 on chart 78 in screen unit R1, and will lie on one of a series of vertical lines (shown in FIGURE 14) which are labelled TOE IN. If the wheel RW instead toes out, the image 206 will lie on one of a series of vertical lines at the left of the vertical zero line and labeled TOE OUT.

The toe measurement thus obtained indicates the total measurement for both wheels. The left hand screen unit L1 is also provided with vertical toe measurement lines to the left and right of the vertical zero line 200, whereby the operation can be initiated by centering the measuring beam image 206 on the vertical zero line 200 of screen unit R1, and then reading the toe-in or toe-out measurement from the chart 78 for the screen unit L1 by the position of its measuring beam image 204.

If the runout, or lateral wobble of the wheels is present, it will be obvious that the toe and camber measurements will be slightly inaccurate because the wheel mirrors will also wobble if the wheel mirror mount 36 (FIG. 1) is used, and the positions of the mirrors can thus vary according to the positions in which the wheels are stopped. If the wheel runout is not to be included in the measurement determinations, the magnetic hub mount (FIG. 3A) is used in lieu of the mirror mounts 36, are previously described, and the reference beams RBR and RBL are not essential to the operation for reasons which will next appear.

As previously mentioned, each reference beam image lies at a target point 202 (FIG. 14) when the aligning apparatus is installed with the checking fixture 190 (FIG. 9). The horizontal lines above the target point 202 are scaled apart proportionate to the vertical distance between the other horizontal lines therebelow, the reason for the different interspacing being that the reflected images of the measuring beams and the reference beam travel different distances before they are returned to the charts 78.

With the wheel RW elevated above its turntable 32, the wheel is manually rotated. If runout is present in the wheel, the associated wheel mirror unit will also wobble, thus causing the measuring beam image 206 (FIG. 10) to describe a circular path 214 (FIG. 14) on the face of the chart 78. Since a change in wheel camber is displayed as a vertical movement upon the chart 78, it follows that the upper and lower limits of the circular path 214 indicate the extent to which the wheel deviates from each side of its true general plane. Accordingly, tilting the mirror 142 for that wheel, by turning the knob 162 (FIG. 7) until the reference beam image at 202 is elevated one division above its former position will correct the runout indicated by the path 214 to be two chart divisions. Thus, a true starting position is obtained in which the effects of the wheel runout are cancelled out, and the alignment measurments determined from this starting position are the most accurate measurements possible with a wheel which wobbles about its turning axis.

Caster, or rearward tilt of the steering or kingpin axis from vertical is measured as a function of the change in wheel camber after the wheels are turned from straight-ahead. In this respect, the caster measurement is obtained in a conventional manner. However, the remotely operable movable caster charts 28 and 30 provide a unique advantage in rapidly obtaining the caster measurements from the technician's vantage point adjacent the steering wheel. The first step in obtaining the caster measurements is to turn one of the wheels, for instance the right wheel RW (FIG. 11), outward 15 degrees from its straight-ahead position. To do so, the technician turns the steering wheel, and the image of the measuring beam MBR reflected by the mirror 142 toward the wheel mirror unit R3 thus impinges the front wing mirror 50 instead of the central mirror 48. By moving the steering wheel until the reflected measuring beam image 206 is centered on the vertical zero line 200, the wheel RW is precisely positioned at 15 degrees to the right from straight ahead.

As is well known, because of caster, the wheel spindles do not move in horizontal planes as the vehicle wheels are turned left or right, and this produces a change in the camber of the wheels. Merely for purposes of illustration, it will be assumed that the measuring beam image 206 moves down to the line indicating 2 degrees of positive camber after the wheel RW is turned 15 degrees to the right. The technician then presses a switch button of the switch unit 26 to energize the chart motor M (FIG. 4) and drive the movable caster chart 30 of the screen unit R1 until its zero line is horizontally aligned with the measuring beam image 206.

Next, the technician turns the steering wheel of the vehicle until the wheel RW, as shown in FIGURE 12, is turned inward, or to the left of straight ahead, 15 degrees. This total movement of 30 degrees is indicated when the measuring beam image 206 lies on the vertical zero line 200 after having been reflected by the rear wing mirror 52. Due to the change in wheel camber, the image 206 will now lie at a different vertical location on the chart, such as on the line indicating 1 degree of positive camber. The horizontal line on the movable caster chart 30 which is aligned with the measuring beam image 206 indicates the caster for the wheel RW, in this case the caster measurement being 1 degree of positive caster.

To determine the toe-out on turns measurement, each wheel is separately turned outward 15 degrees, as shown in FIGURE 13 for the right wheel RW, and its toe-out measurement is read from the opposite screen unit. In this case the screen unit L1 will show the toe out on turns for the wheel RW. In actual practice, this step is carried out at the time the caster measurement is begun. Thus, FIGURE 13 shows the same conditions present in FIGURE 11, but the toe measurement operations is separately illustrated for clarity. When the measuring beam image 206 is moved to the position illustrated on the screen unit R1, the measuring beam image 204 for the wheel LW is proportionately displaced on its chart 78.

The front wing mirror 50 for wheel RW is normal to the measuring beam MBR reflected from the wheel mirror unit R3. Because the turning radius of the wheel LW is greater than the turning radius of the wheel RW during a turn to the right, the measuring beam MBL for the left wheel LW is reflected to a point on the chart 78 of screen unit L1, inward of the vertical zero line 200. As is indicated at 207 in FIGURE 14 for the opposite chart 78 of screen unit R1, this area has vertical lines marked from 15 to 17 degrees, and the position of the measuring beam image 204 among these lines indicates the toe-out on turns for the wheel RW.

It will be understood that the sequence of alignment measuring operations outlined above is not necessarily that which is employed in actual practice. As a measure of the efficiency of the alignment apparatus A, in one instance the alignment measurements were carried out in a different sequence and were recorded and completed exclusive of a wheel runout correction, in less than 3½ minutes.

Two important points to be noted are that the reference beams RBL and RBR, and the means for tilting the mirrors 142 about the axes 146 are not essential to the apparatus. In the first instance, the reference beams are useful in restoring the accurate pre-alignment of the apparatus if some component should be accidentally bumped and moved, because the reference beam images will be dislodged from their normal target points on the charts 78. Of course, elimination of the reference beam presupposes that a wheel runout measurement is not necessary and can be eliminated from the alignment measurements. Since the means for tilting the mirrors 142 about the axes 146 are allied with the use of the reference beam, and because the initial installation can be carried out by adjusting the positions of the relay mirror units as well as the positions of the mirrors therein by means including the adjustment screws 156, 180 and 182 (FIG. 8), the mirror tilting mechanism is not essential if the reference beams are eliminated. To install the apparatus without employing the reference beams, the reflected images of the measuring beams back of the charts 78 need only be centered upon the intersections of the vertical and horizontal zero lines of the charts 78.

It will be apparent from the preceding description that the wheel alignment apparatus of the present invention has features which particularly adapt it for use in a diagnostic lane system wherein vehicles are subjected to various mechanical tests and inspections along the lane, such features including the remote control of the caster charts 28 and 30, the elimination of the previously required individual adjustment of the relay mirror units when the alignment checking operation is carried out, and the silicon damping of the wheel mirror units R3 and L3. The reference beams RBL and RBR provide a convenient and continuously effective means for visually determining that the components are properly aligned, as well as providing correction for wheel runout.

Although the best mode contemplated for carrying out the present invention has been herein shown and described, it will be apparent that modification and variation may be made without departing from what is regarded to be the subject matter of the invention as set forth in the appended claims.

What I claim is:

1. In apparatus for optically measuring wheel alignment characteristics wherein one of a pair of measuring beams of light is projected alongside each of a pair of wheels at one end of a vehicle, each beam being individually reflected by a relay mirror unit on a side of the vehicle onto a mirror mounted on the wheel on that side of the vehicle, said mirror mounted in parallelism to the general plane of said wheel, and wherein each beam is returned toward its point of origin successively by its wheel mirror and its relay mirror unit to impinge indicia adjacent the source of said light beams to determine a wheel alignment characteristic, the improvement comprising a movable chart and an adjacent fixed chart associated with each of said wheels and displaying said indicia, remotely operable electrically powered means for vertically moving each movable chart relative to the adjacent fixed chart, and control means at a station remote from said charts for individually controlling said electrically powered means for each movable chart.

2. Apparatus according to claim 1 including a checking fixture to prealign said relay mirror units to reflect each of the returned measuring beams to a predetermined point on its associated fixed chart.

3. Apparatus according to claim 1 including an individual projector for each of said light beams, said projector, said relay mirror unit and said fixed and movable charts at one side of the vehicle being spaced from the group of like parts at the other side of the vehicle a distance sufficient to allow movement of the vehicle between and past said projectors, said relay mirror units and said charts.

4. Apparatus according to claim 1 in which each of said wheel mirrors includes a fixed pivot shaft generally perpendicular to the general plane of the wheel upon which it is mounted, a body casting mounted in depending relation from said pivot shaft for free oscillatory movement in a plane substantially parallel to said general plane, means defining a closed shear chamber intermediate said body casting and said pivot shaft, relatively movable portions of said body casting and said pivot shaft being in confronting relation within said chamber, and a high kinematic viscosity silicone compound substantially filling said chamber in contact with said relatively movable portions.

5. Apparatus according to claim 3 in which each projector is provided with means for dividing the light beam into two parts, a measuring beam and a reference beam in predetermined orientation relative to said measuring beam; means defining a separate reflecting surface for each beam in each of said relay mirror units; means for conjointly moving said reference and measuring beam reflecting surfaces about a horizontal axis normal to the optical axis of said projector, and means defining a predetermined target point on said fixed chart for said reference beam, said latter beam when positioned on said target point causing said measuring beam to have a precise predetermined relation to indicia on said chart.

6. Apparatus according to claim 1 in which said control means station is adjacent said relay mirror unit for the left wheel of the vehicle.

7. Apparatus according to claim 2 in which each of said fixed charts is provided with indicia in the form of a zero line vertically intersecting said predetermined point so that the measuring beams returned to the fixed charts and lying on both of said zero lines indicate a straight ahead alignment of the wheels, and in which said control means station is adjacent said relay mirror unit for the left front wheel of the vehicle.

8. The apparatus of claim 1 in which said movable charts have indicia relating to a caster measurement for the wheels and in which said charts are vertically movable, said fixed charts each being positioned beside the associated movable chart and cooperatively associated therewith in a caster measurement determination.

9. The apparatus of claim 1 wherein each of said movable charts includes a drive roller and an idler roller, said chart comprising an endless flexible band trained about said rollers, and wherein said electrically powered means is an electric motor coupled to said drive roller, said motor being operable to rotate said drive roller in either direction.

10. A wheel mirror assembly comprising a fixed pivot shaft, means mounting said pivot shaft generally perpendicular to the general plane of a vehicle wheel, a body casting mounted in depending relation from said pivot shaft for oscillatory movement in a plane substantially parallel to said general plane, means defining a closed shear chamber intermediate said body casting and said pivot shaft, relatively movable portions of said body casting and said pivot shaft being in confronting relation within said shear chamber, and a silicone substance having high kinematic viscosity substantially filling said chamber and in contact with said relatively movable portions to damp the oscillatory movement of said casting.

11. A wheel mirror assembly comprising a fixed pivot shaft having a diametrically enlarged portion secured thereto, means mounting said pivot shaft generally perpendicular to the general plane of a vehicle wheel, a body casting mounted in depending relation from said pivot shaft for oscillatory movement in a plane substantially parallel to said general plane, means including said enlarged portion defining a shear chamber intermediate said body casting and said pivot shaft, relatively movable portions of said body casting and said pivot shaft portion being in confronting relation within said shear chamber, and a silicone compound in said chamber in contact with said relatively movable portions to damp the oscillatory movement of said casting.

12. The apparatus of claim 11 in which the end wall of said shear chamber opposite said enlarged portion of the pivot shaft is a clear plate affixed to said body casting, said plate providing for visual inspection of the compound in said chamber.

13. The structure of claim 12 wherein the end wall to end wall dimension of said shear chamber is in the order of .030 of an inch.

References Cited

UNITED STATES PATENTS

| | | |
|---|---|---|
| 2,475,502 | 7/1949 | Holmes. |
| 2,700,319 | 1/1955 | Carr. |
| 2,765,701 | 10/1956 | Carrigan. |
| 3,055,264 | 9/1962 | Hunter. |
| 3,363,504 | 1/1968 | Lill. |

FOREIGN PATENTS 899,609  11/1958  Great Britain.

RONALD L. WIBERT, Primary Examiner

J. ROTHENBERG, Assistant Examiner

U.S. Cl. X.R.

33—46.2